Aug. 2, 1966  W. L. CARLSON ETAL  3,264,506
DYNAMOELECTRIC MACHINE
Filed June 27, 1962  2 Sheets-Sheet 1

INVENTORS
WILBUR L. CARLSON
ARTHUR T. GREGG
JAMES R. VANDE SANDE
BY W. E. Finken
THEIR ATTORNEY

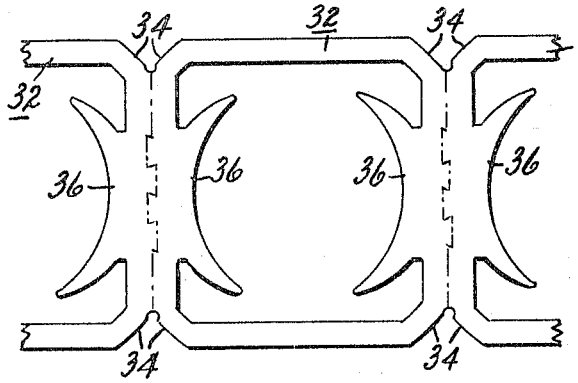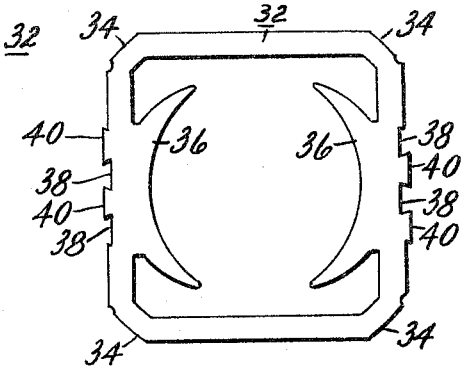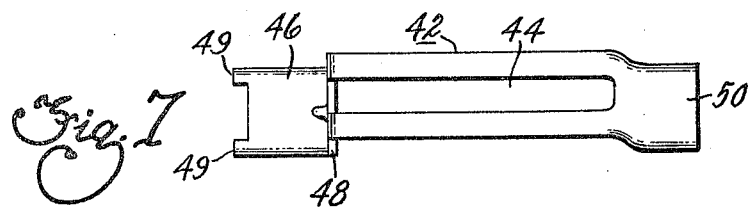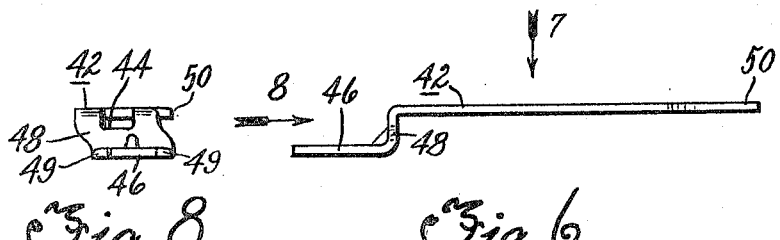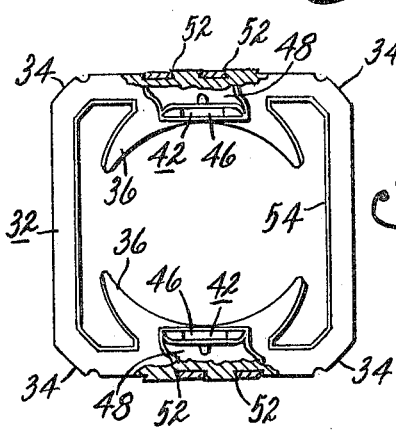

United States Patent Office 3,264,506
Patented August 2, 1966

3,264,506
DYNAMOELECTRIC MACHINE
Wilbur L. Carlson, Arthur T. Gregg, and James R. Vande Sande, Rochester, N.Y., assignors to General Motors Corporation, Detroit, Mich., a corporation of Delaware
Filed June 27, 1962, Ser. No. 205,791
1 Claim. (Cl. 310—216)

This invention pertains to dynamoelectric machines, and particularly to an improved direct current electric motor designed for automotive use.

In the mass production of heater motors for automotive use, these motors being used to drive blowers, any savings that can be realized in material or assembly costs are significant. In the past it has been the practice to use substantially circular laminations in the stator core, which laminations are held in assembled relation by either welds or rivets. In this type of motor construction the stator is held in assembled relation with the cup-shaped half of the case by staking, or welding and the two halves of the motor case are held together by tie bolts. The present invention relates to a motor assembly wherein the laminations used in the stator core are designed to realize material savings; wherein the several laminations of the stator core are held in assembled relation by brackets; wherein the stator assembly is retained in the case by a press-fit; and wherein the two parts of the case are rigidly secured together by spot welds.

Accordingly, among our objects are the provision of an improved stator core structure for a dynamoelectric machine; the further provision of an improved stator assembly for a dynamoelectric machine including means for supporting a brush holder; the further provision of a dynamoelectric machine wherein the stator assembly is secured within the case by a press-fit; and the still further provision of a dynamoelectric machine including a two-part case which is press-fitted together and thereafter spot welded, one part of the case having an integral mounting flange.

The aforementioned and other objects are accomplished in the present invention by utilizing substantially rectangular laminations in the stator core, the laminations having arcuate corners so that when held in assembled relation by a pair of brackets and provided with windings, the stator assembly can be press-fitted into a cup-shaped case part. Specifically, two opposite legs of each lamination are formed with dove-tailed grooves and corresponding projections designed to receive complementary slotted brackets which are staked thereto to form a stator core. The projecting ends of the bracket support the end turns of the field windings, and the forwardly extending bracket ends also support a brush holder. One case part is formed with an integral mounting flange and an enlarged diameter lip portion into which the other cup-shaped case part can be press-fitted. The two case parts carry self-aligning bearings within which a rotor assembly is journalled. The two case parts are rigidly retained in assembled relation after operational testing, by a plurality of circumferentially spaced, low penetration spot welds.

Further objects and advantages of the present invention will be apparent from the following description, reference being had to the accompanying drawings, wherein a preferred embodiment of the present invention is clearly shown and wherein similar numerals depict similar parts throughout the several views.

In the drawings:

FIGURE 4 is a fragmentary view, in elevation, depicting the manner in which the stator laminations are punched from strip stock.

FIGURE 5 is a view in elevation of a stator lamination.

FIGURE 6 is a side view in elevation of a bracket.

FIGURES 7 and 8 are plan and end views, in elevation, of the bracket taken in the direction of arrows 7 and 8, respectively, of FIGURE 6.

FIGURE 9 is an end view, partly in section and partly in elevation, with certain parts broken away, of the stator stack.

Figure 1:
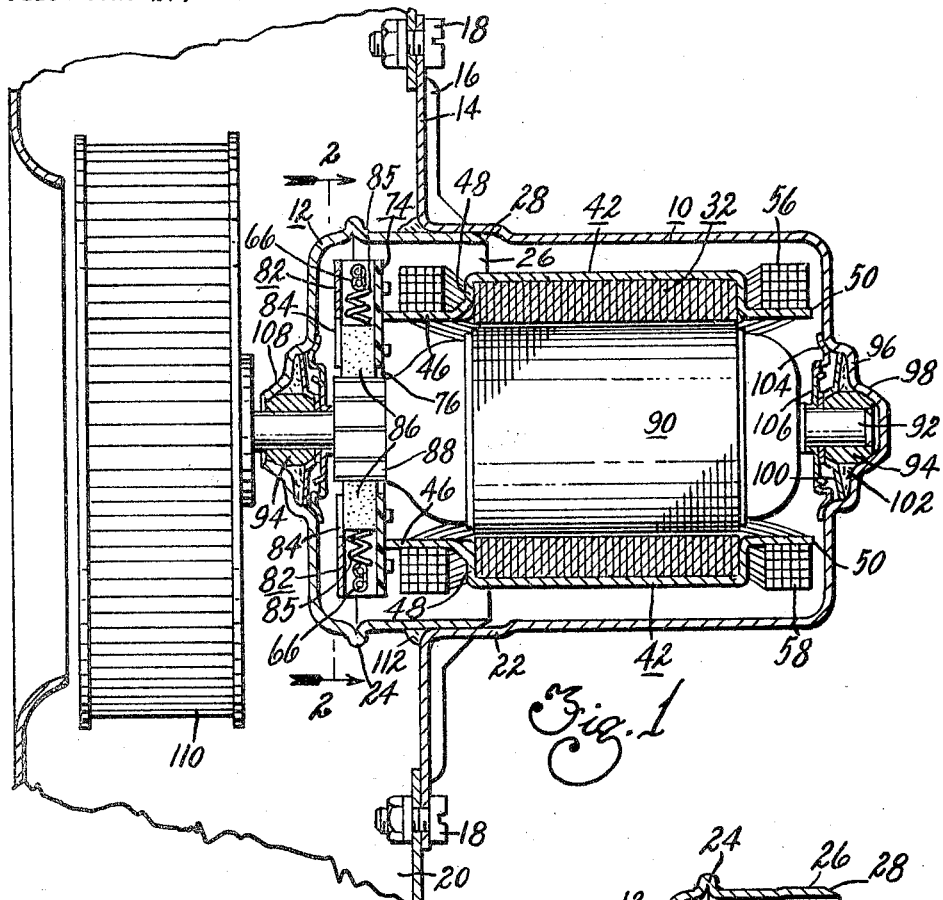
FIGURE 1 is a fragmentary, longitudinal, sectional view of the improved electric motor attached to a blower housing.
Figure 2:
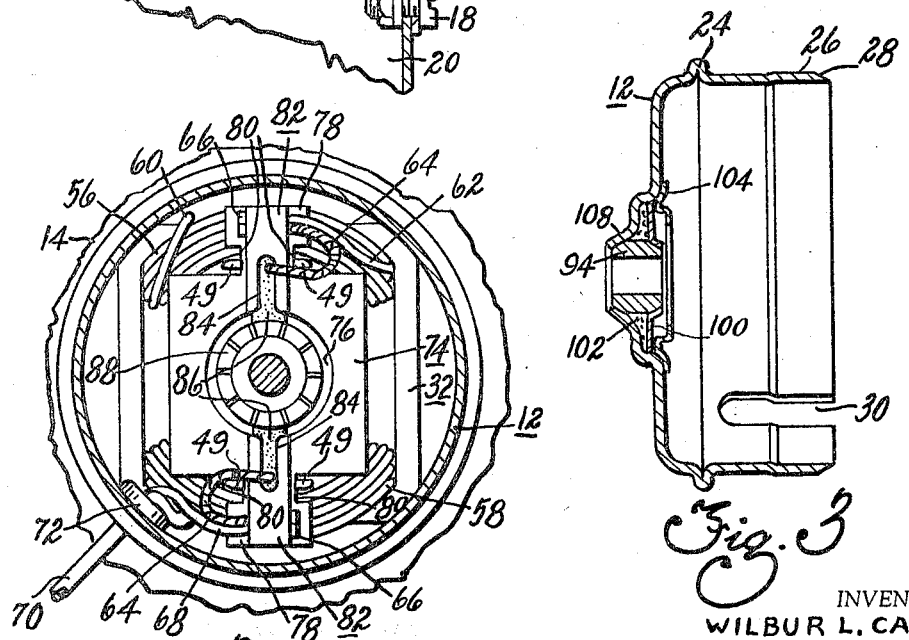
FIGURE 2 is a view, partly in section and partly in elevation, taken along line 2—2 of FIGURE 1.

Referring to FIGURES 1 and 2, the improved dynamoelectric machine comprises a two-part case, namely a cup-shaped rear case part 10 and a cup-shaped commutator case part 12. The parts 10 and 12 are preferably made of deformable sheet metal. The rear case part 10 is formed with an integral mounting flange 14, which may be of substantially circular profile, having a plurality of circumferentially spaced, radially extending strengthening ribs 16. The mounting flange 14 may be connected, as shown, by bolts 18 to a blower housing 20. In addition, the rear case part 10 is formed with a lip portion 22 having an inner diameter greater than the nominal inner diameter of the main cup-shaped portion of the case part 10.

Figure 3:
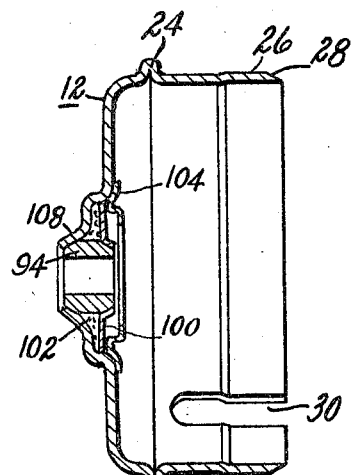
FIGURE 3 is a sectional view of the commutator end case part.

The commutator case part 12 is likewise generally of cup-shaped configuration and is formed with an integral annular strengthening rib, or shoulder, 24 and, as particularly shown in FIGURE 3, has a lip portion 26 of slightly greater diameter with a beveled outer edge 28. The case part 12 is also formed with an axially extending open slot 30, the purpose of which will be described hereinafter. The lip 26 of the case part 12 is press-fitted into the lip portion 22 of the rear case part 10, and in so doing the lip 26 is substantially deformed so as to be substantially nonexistent when the two case parts are assembled as shown in FIGURE 1.

Referring to FIGURES 4 through 9, the stator assembly comprises a stack of laminations 32 having a substantially rectangular profile, or outline. More particularly, each lamination has four legs disposed at substantially right angles to each other and arcuate corners 34, the legs being of substantially, although not exactly, the same length. The arcuate corners 34, if connected, would define a circle which would inscribe the lamination, this circle having a diameter slightly greater than the nominal diameter of the main cup-shaped portion of the rear case part 10. The laminations 32 can be conveniently stamped from magnetic steel strip stock, as shown in FIGURE 4, and have diametrically opposite pole pieces 36 with mutually offset dove-tail grooves 38 and corresponding projections 40. A substantial savings in material can be realized by having a substantially rectangular profile for the laminations 32 inasmuch as the central area removed by forming the pole pieces 36 can be used for the core of the rotor, and the strip stock need only have a width which is equal to the length of the straight-edged legs of the laminations.

The stator core comprises a plurality of stacked laminations which are clamped together in any suitable fixture, not shown, and thereafter rigidly secured together under compression by a pair of brackets 42. The brackets 42, as seen in FIGURES 6 through 8, are composed of sheet metal have an elongate medial slot 44 designed to receive the dove-tail projection 40 on each side of the laminations. One end 46 of each bracket 42 is offset both laterally and vertically to define a shoulder 48 against which the front end lamination of the stator stack is positioned. This end 46 of the bracket is formed with a pair of projecting fingers 49. The other end 50 of each bracket 42 is likewise laterally offset, and after the brackets are positioned over the dove-tail projections 40 on the stator stack, with the bracket legs in the grooves 38 and the shoulders 48 in engagement with the front end lamina, the ends 50 are formed over the end of the rear end lamina so as to be coplanar with the ends 46, as clearly seen in FIGURE 1. Thereafter, the brackets are staked at 52 within the dove-tail grooves 38 to securely retain the laminations in stacked relation to form the core.

Prior to winding the coils around the pole pieces 36, the stator core, as shown in FIGURE 9, has certain portions thereof covered with an insulative plastic coating 54. More particularly, the exposed surfaces of the end laminations 32 are coated as are the ends 46 and 50 of the brackets, except for the fingers 49, and the entire inner periphery of the stator stack except for the arcuate faces of the pole pieces 36. The selective area coating of the stator stack may be accomplished in accordance with the method disclosed in copending application Serial No. 125,844 filed July 21, 1961, in the name of Deyle et al. and assigned to the assignee of this invention.

Thereafter, a pair of coils 56 and 58 each comprising a plurality of turns of magnet wire, are wound around the bodies of the pole pieces 36 with the end turns of the coils being supported by the bracket ends 46 and 50 as clearly shown in FIGURE 1. One terminal lead 60 of the coil 56 is attached to a clip, not shown, which is thereafter welded to the outer periphery of the stator stack. The other terminal lead 62 of the coil 56 is connected to a brush shunt 64 by a clip 66. One terminal lead 68 of the coil 58 is connected by a second clip 66 to a second brush shunt 64, and the other terminal lead 70 of the coil 58 is protected with an insulating sleeve and extends through a rubber grommet 72 which is supported adjacent the closed end of the slot 30 in the case part 12.

A brush holder plate 74 of insulating material is held in position by the fingers, or prongs, 49 on the end portions 46 of the brackets 42. More particularly, as seen in FIGURE 2, the brush holder plate 74 has a central current collector opening 76 and a pair of diametrically opposed legs 78 with marginal notches 80. The notched legs 78 interfit between the fingers 49 on the brackets 42, after which the fingers 49 are squeezed together so as to securely support the brush holder plate 74. Each leg of the brush holder plate carries a channel-shaped metal brush box 82 which is preferably of the type described in copending application Serial No. 91,450 filed February 24, 1961, now Patent No. 3,127,533, in the name of Gardner and assigned to the assignee of this invention. Thus, each brush box 82 includes aligned elongate closed slots in its side walls, not shown, and an open ended slot 84 in its front wall. The clips 66 form a seat for the brush springs 85, as shown in FIGURE 1, and the brush shunt extends through the open ended slot 84 with the brushes 86 projecting from the brush holders for engagement with a current collector member, in this case a commutator 88.

When the stator assembly comprising the stator core, the coils 56 and 58 and the brush holder has been assembled, it is press-fitted into the rear case part 10. The press-fit between the stator laminations 32 and the case part 10 securely retains the stator assembly within the case part 10. During this assembly, care must be exercised so that the stator assembly is not pressed too far into the case part 10 to assure that the brushes will be aligned with the commutator when the rotor is assembled therewith.

The rotor assembly comprises a conventional wound armature core 90 attached to a shaft 92. The rear end of the shaft 92 is journalled in a self-aligning bearing 94 supported in a socket 96 having a spherical seat 98 of the case part 10, and held in assembled relation therewith by a spring retainer 100. A lubricant impregnated felt washer 102 is disposed between the spring retainer 100 and the socket wall surrounding the spherical seat 98. The spring retainer 100 is held in assembled relation with the bearing 94 by a slinger shield 104 spot welded to the case part 10 and having an opening for accommodating a slinger ring 106 attached to the shaft 92.

The case part 12 is formed with an open ended integral spherical seat 108 for supporting a second self-aligning bearing 94, the bearing support for the commutator end of the rotor being identical to that previously described. The rotor shaft 92 projects outside of the case part 12 for attachment to a blower wheel 110 within the blower housing 20.

After assembly of the rotor within the stator assembly and the case part 10, the case part 12, as aforementioned, is press-fitted into the lip portion 22 of the case part 10. The desired end play of the rotor shaft between the spaced bearings 94 is established by the position of the commutator case part 12, and after this assembly the performance characteristics of the motor are checked. If the performance characteristics of the motor are satisfactory, the two case parts 10 and 12 are thereafter rigidly secured together by a plurality of circumferentially spaced, low penetration spot welds 112 at the junction between the flange 14 of the case part 10 and the case part 12.

While the embodiment of the invention as herein disclosed constitutes a preferred form, it is to be understood that other forms might be adopted.

What is claimed is as follows:

A dynamoelectric machine comprising a case, stator and rotor assemblies, a brush assembly and coil windings, said case including first and second cylindrical cup-shaped parts of deformable sheet metal being press-fitted at the open end of each part along telescoping cylindrical lip portions, the open end of the outer overlapping case part terminating in a radially extending mounting flange; said stator assembly including a laminated core having substantially rectangular laminations with notches along opposite sides thereof forming dovetailed projections, the corners of said laminations having an arcuate configuration corresponding to the cylindrical case and being press-fitted to the inner surface of said case; said stator assembly also including a pair of bracket members with each member including an elongated slot receiving the dovetailed projections along opposite core sides, the opposite ends of each bracket member being offset at each end of said laminated core thereby retaining and securing said core laminations, said opposite ends of each bracket terminating in coplanar extending shoulder portions with the shoulder portions of each bracket supporting opposite ends of a coil winding, one shoulder portion of each bracket member having finger projections engaging said brush assembly to support the brush assembly between the finger projections; and said first and second cup-shaped parts having bottom end portions with bearing supports receiving the shaft of said rotor assembly, said bearing supports being aligned with the rotor shaft when the lip portions of said case parts are press-fitted together in telescoping relationship, the circumferential junction of said cup-shaped parts being secured together by a plurality of circumferentially spaced low penetration welds with the cup-shaped parts overlapping for a predetermined length establishing a predetermined spacing between the bearing supports and fixing the end play of said rotor shaft.

References Cited by the Examiner

UNITED STATES PATENTS

| | | | |
|---|---|---|---|
| 1,222,107 | 4/1917 | Kent | 310—254 X |
| 1,424,164 | 8/1922 | Hoover | 310—217 X |
| 1,520,237 | 12/1924 | Gilchrist | 310—89 |

(Other references on following page)

UNITED STATES PATENTS

| | | | |
|---|---|---|---|
| 1,586,390 | 5/1926 | Steinhart | 310—89 X |
| 2,405,904 | 8/1946 | Rataiczak | 29—155.5 X |
| 2,423,750 | 7/1947 | Benson | 310—42 X |
| 2,569,137 | 9/1951 | Westrich | 219—137 X |
| 2,629,061 | 2/1953 | Swarthout | 310—42 |
| 2,684,991 | 7/1954 | Marks | 219—137 X |
| 3,089,047 | 5/1963 | Perzyk | 310—247 X |

FOREIGN PATENTS

| | | |
|---|---|---|
| 144,777 | 2/1950 | Australia. |
| 760,943 | 6/1953 | Germany. |

MILTON O. HIRSHFIELD, *Primary Examiner.*

ORIS L. RADER, *Examiner.*

P. L. McBRIDE, J. J. SWARTZ, *Assistant Examiners.*